B. B. HILL.
PNEUMATIC TIRE.
APPLICATION FILED SEPT. 6, 1910.

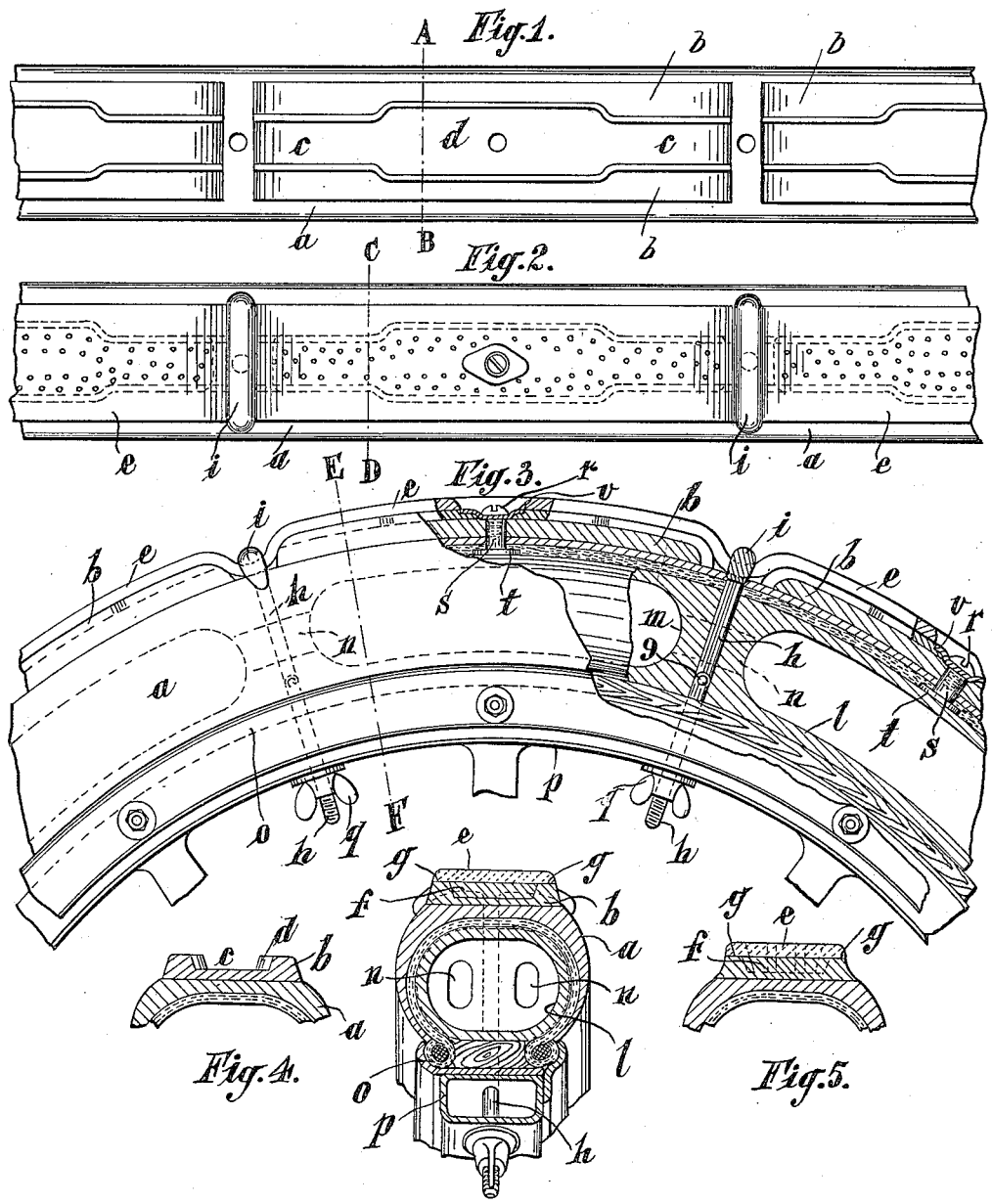

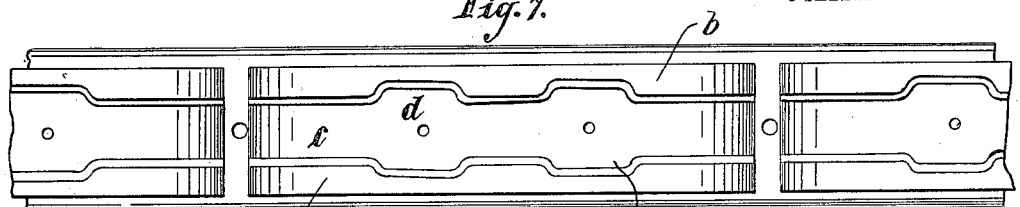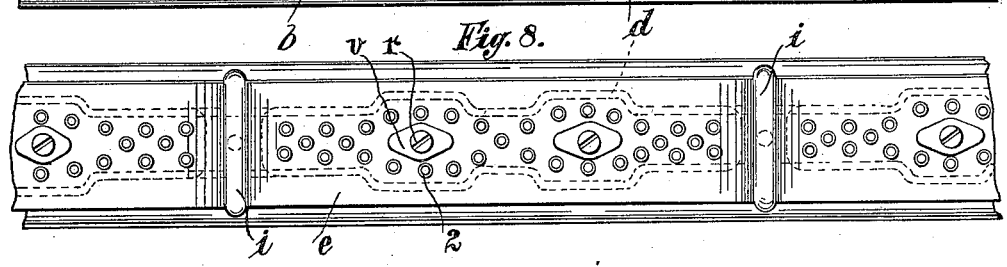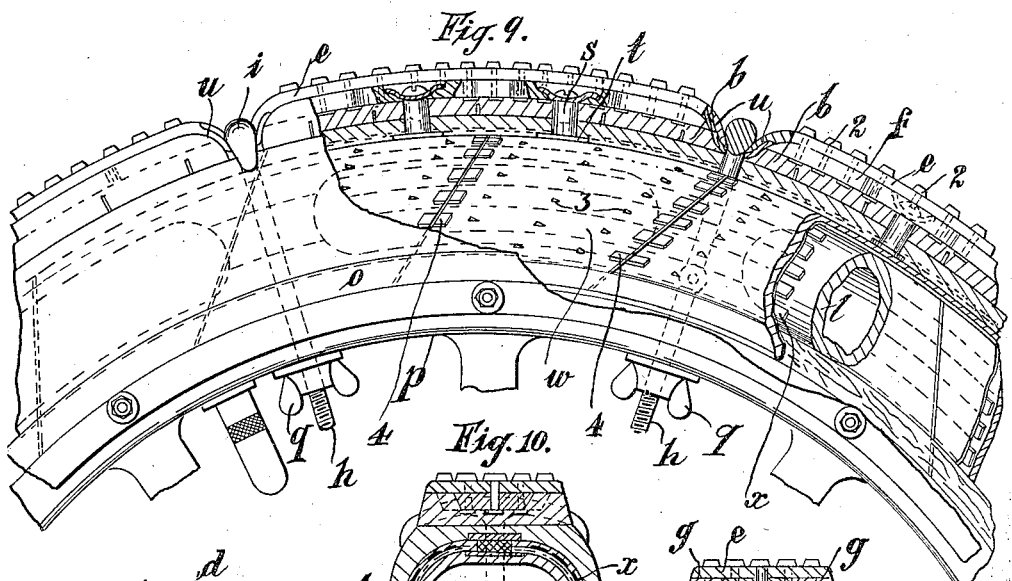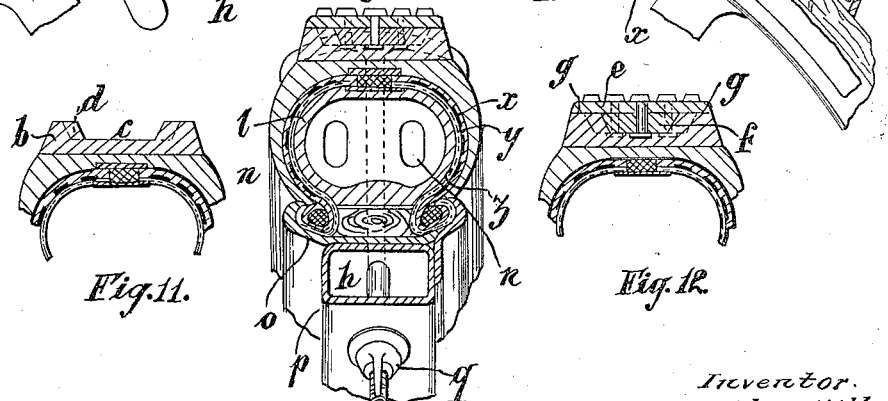

1,036,493.

Patented Aug. 20, 1912.
3 SHEETS—SHEET 3.

Witnesses:
W. A. Williams
Mable McCurdy

Inventor.
Barton Berkley Hill.
by, Jno. Murrie
Attorney.

UNITED STATES PATENT OFFICE.

BARTON BERKLEY HILL, OF LONDON, ENGLAND.

PNEUMATIC TIRE.

1,036,493.  Specification of Letters Patent.  Patented Aug. 20, 1912.

Application filed September 6, 1910. Serial No. 580,564.

*To all whom it may concern:*

Be it known that I, BARTON BERKLEY HILL, a citizen of the United States of America, residing at 29a Princess May road, London, N., England, have invented certain new and useful Improvements in Pneumatic Tires, of which the following is a specification.

This invention relates to the tires of vehicle wheels and more particularly to cushion, pneumatic or other resilient tires which are provided with leather or like wear resisting and puncture proof treads.

Proposals have been made from time to time to protect the tread of a rubber tire with a band of leather or the like, in order to avoid the necessity for and expense of thick rubber treads; but the modes of securing the leather band have been more or less inefficient as regards facility of renewal of the tread, or have interfered with the flexibility of the tire, or have not assured against accidental detachment of the band when in use.

The object of the present invention is to overcome these defects in such a manner as to render the use of an easily renewable thick leather or like tread possible and to minimize the use of rubber in the construction of the tire.

The invention also consists in forming the periphery of the tire with a circumferential groove having lateral enlargements at intervals, and in providing a leather or like tread with a rib or foundation adapted to fit the groove and enlargements thereof, so that the tread interlocks with the tire or cover and lateral or circumferential movement between the two is avoided.

The invention consists in forming the periphery of the tire with a series of projections or bosses and in straining the leather or like tread over these projections by suitable means, such as straining bolts adapted to engage and draw down the tread into depressions between the projections, the bosses being formed on the cover alone, or both on the cover and inner tube.

The invention further comprises a special inner tube and details hereinafter referred to.

Figure 15:
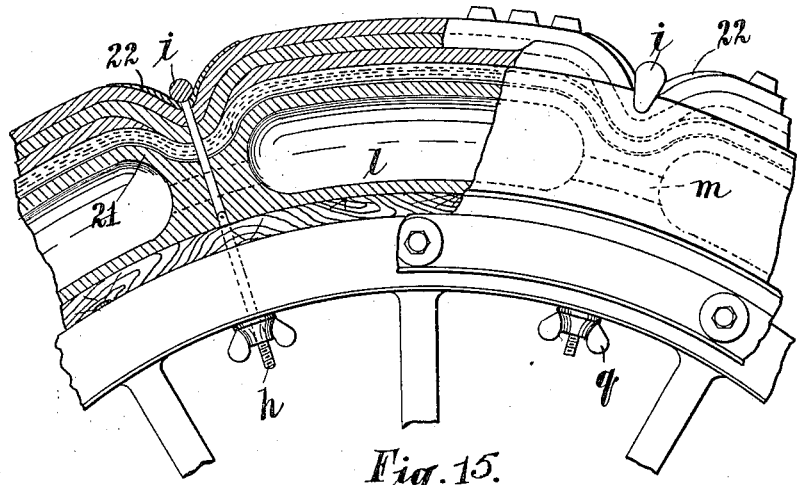
Figure 16:
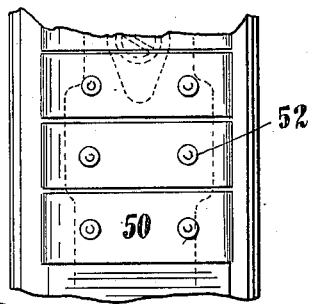
Figure 13:
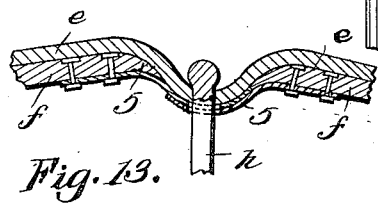
Figure 14:
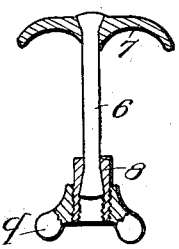
Figure 17:
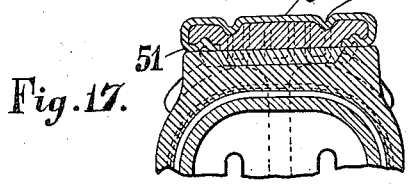

The accompanying drawings illustrate several modes of carrying out the invention, Figure 1 being a plan of a portion of one form of cover ready to receive the detachable tread. Fig. 2 is a similar plan with the tread in position. Fig. 3 is a side elevation partly in section, corresponding to Fig. 2. Figs. 4, 5 and 6 are cross-sections on the lines A—B, C—D, E—F, Figs. 1 to 3 respectively. Figs. 7 to 12 are views similar to Figs. 1 to 6 but illustrating another mode of carrying out the invention. Figs. 13 and 14 are sections of alternative details. Fig. 15 is a sectional side view of a tire illustrating a further mode of carrying out the invention. Figs. 16 and 17 illustrate armoring which may be used for the tread.

In carrying out the invention according to one mode as illustrated by Figs. 1 to 6, a tire cover $a$, is provided with a number of bosses or projections $b$, upon its periphery. It is also provided with a circumferential groove $c$, preferably of wedge shape in cross section and which is laterally enlarged at intervals, for instance, as at $d$, said groove being interrupted at intervals in the present embodiment of the invention by depressions formed by the spaces between the bosses. A band or tread $e$, of leather, or preferably of leather treated with rubber, for instance according to the now known Silberrad process, is formed with a projecting rib $f$, or foundation strip, adapted to fit into the groove $c$, the rib being enlarged at intervals to correspond with the enlargements $d$, in the groove. The tread preferably overlaps the sides of the groove as indicated at $g$, $g$. The tread $e$, may be formed integrally with the rib $f$, or may be clenched thereto by staples or studs, or otherwise secured thereto. The tread so formed is placed on the cover and is drawn down into the groove and strained over the projections $b$, by suitable means, such as straining or clamping bolts $h$, having suitably shaped heads $i$. When an inflatable inner tube is used the tread is preferably placed in position while the tube is in the deflated condition; and when the bolts pass through the inner tube $l$, leakage is avoided by surrounding them with sleeves $m$, which may be molded integrally with the tube and may be thick enough to afford a support under each depression in the tread. The sleeves $m$, may be perforated as at $n$, $n$, to complete the continuity of the interior of the tube $l$, although separate compartments may be preferable in some cases. The inner tube may be reinforced with canvas in known manner. The bolts $h$, may pass through the rim $o$, and felly $p$, and may be fitted with wing nuts $q$, or other tightening devices. They may be in two parts hinged together as at 9 in order to allow them to give slightly during the running of the tire, or they may be of wire splayed at the ends in the heads 7 and ferrules 8 as in Fig. 15, the bolt being designated 6 in that view. In addition to the bolts $h$, the tread $e$, may be secured to the cover $a$, by screws $r$, adapted to enter hollow stems $s$, on the broad heads $t$, so as to permit ready detachment. The stems $s$, may be molded in the tire cover so as to prevent accidental detachment. The slotted heads of the screws $r$, may bed on washers $v$. After the tread has been clamped in position, the inner tube $l$, may be inflated, and as the tire tends to expand, the tread will be still more firmly strained over the projections and into the groove. It will thus be firmly retained so as to resist any tendency to lateral shifting, due to shocks, or circumferential creeping, due to driving stress. On the other hand it can be readily removed for repair or for substitution by another tread when worn.

In another mode of carrying out the invention as illustrated in Figs. 7 to 12 the detachable tread $e$, is made in sections overlapping or rabbeted together at the adjacent ends as indicated at $u$. Two enlargements $d$, are also provided in each grooved portion in this case. The tread sections $e$, are secured to foundation strips or ribs $f$ by metal studs 2. The detachable sections of tread further facilitate repair as only the section or sections injured need be renewed. The rib or foundation $f$, may be continuous, but is preferably interrupted at each depression. The sections of rib may be connected at those points by slotted metal plates 5, Fig. 13, through which the bolts $h$, pass. The plates 5 are nested in one another and may be riveted or otherwise secured to the rib. This arrangement may be adopted in either form of tire above described. The cover is also shown in Figs. 9 to 12 as reinforced by a corset comprising strips $w$, of leather cut so that they may be arranged diagonally and having metal or other flexible strips or laths $x$, secured to them, the strips $w$, being each lined with strips of canvas, $y$, of similar shape and being also secured to a continuous canvas lining $z$, by cementing or sewing. The laths $x$ may have prongs 3 stamped out of them for clenching the strips and may have their ends bent over to clench the ends 4 of the strips $w$. The leather and canvas may also be sewn together between the laths. With this method of reinforcing the cover the use of a canvas in the cover may be minimized or avoided. The tread $e$, may be provided with armoring in the form of metal plates 50, Figs. 16 to 17, clenched thereto by folding over the edges 51, and stamping depressions 52 in the plates. By the invention the use of rubber in the tire may be reduced to a minimum.

In a further mode of carrying out the invention, as illustrated in Fig. 15 the inner tube $l$ is also formed with bosses or projections 21 corresponding in position with the bosses or projections $b$, of the outer cover, and nesting in the hollows formed beneath the projections $b$. In Fig. 15 plates or washers 22, are shown below the heads $i$, of the straining bolts $h$. The plates 22 protect the tread where it is drawn tightly into the depressions, and so avoid cutting of the tread at these parts by sharp stones or the like. All other parts are similarly lettered to the corresponding parts in the other figures.

It will be understood that the invention is applicable to cushion, or solid rubber, or other like resilient tires. When applied to a pneumatic tire it is not confined to any special type of cover or inner tube, and the means for straining the tread may be varied to suit the type of cover or tube adopted. Whereas it is preferred to use leather treated with rubber, according to the Silberrad process, or so called "rubberized leather" for the detachable tread, it is to be understood that hard rubber, prepared canvas, or material similar to that used for driving belts may be used. As the foundation strip does not have to withstand any wear it may be of any suitable material, and need not be of leather, it may be of stamped metal if desired.

Having thus described my invention what I desire to secure by Letters Patent is:—

1. A tire having grooved projections on its periphery and recesses intermediate of said projections, a tread made in sections, each having a rib to fit in the grooves of one of said projections, T-headed bolts adapted to pass through the ends of said sections of tread and to strain them down into the aforesaid intermediate recesses, substantially as hereinbefore set forth.

2. A tire formed on its periphery with grooved projections and with depressions between said projections, a tread provided with a rib fitting in said grooves and interrupted at said depressions, and bolts passing through said tread at said depressions and straining said tread therein toward the periphery of the tire between the adjoining interrupted ends of the rib.

3. A tire having grooved projections on its periphery and recesses between said projections, a tread made in sections with overlapping ends registering with said depressions, each section having a rib fitting in the groove of one of said projections and bolts passing through said tire and overlapping ends and straining the latter into the depressions.

In testimony whereof I affix my signature in presence of two witnesses.

BARTON BERKLEY HILL.

Witnesses:
L. M. MITCHELL,
A. W. MATHYS.